United States Patent [19]

Matsumoto et al.

[11] Patent Number: 5,590,399
[45] Date of Patent: Dec. 31, 1996

[54] UP-LINK CHANNEL ASSIGNMENT SCHEME FOR CELLULAR MOBILE COMMUNICATIONS SYSTEMS EMPLOYING MULTI-BEAM ANTENNAS WITH BEAM SELECTION

[75] Inventors: Tadashi Matsumoto, Walnut Creek; Seiji Nishioka, San Ramon, both of Calif.

[73] Assignees: Nextel Communications, Lafayette, Calif.; NTT Mobile Communications Network Inc., Tokyo, Japan

[21] Appl. No.: 393,210

[22] Filed: Feb. 23, 1995

[51] Int. Cl.⁶ ..................................................... H04Q 7/30
[52] U.S. Cl. ........................... 455/33.3; 455/33.4; 379/60
[58] Field of Search ................................. 455/33.1, 33.2, 455/33.3, 33.4, 34.1, 34.2, 54.1, 56.1, 62, 63; 379/59, 60; 375/348

[56] References Cited

U.S. PATENT DOCUMENTS

| | | | |
|---|---|---|---|
| 3,764,915 | 10/1973 | Cox et al. | 325/53 |
| 4,128,740 | 12/1978 | Graziano | 179/2 |
| 4,144,496 | 3/1979 | Cunningham et al. | 455/53.1 |
| 4,355,411 | 10/1982 | Reudink et al. | 455/35 |
| 4,783,781 | 11/1988 | Alexis | 370/95 |
| 4,965,850 | 10/1990 | Schloemer | 455/33.1 |
| 5,093,924 | 3/1992 | Toshiyuki et al. | 455/33.1 |
| 5,203,008 | 4/1993 | Yasuda et al. | 455/33.1 |
| 5,327,577 | 7/1994 | Uddenfeldt | 455/33.2 |
| 5,448,751 | 9/1995 | Takenaka et al. | 455/33.1 |
| 5,485,631 | 1/1996 | Bruckert | 455/33.3 |

OTHER PUBLICATIONS

Sallberg et al. IEEE Hybrid channel assignment and reuse partitioning in a cellular mobile telephone system. Jun. 1, 1987 pp. 405–411.

Proakis, John G., Digital Communications, 2nd Ed., Chapter 4, "Modulation and Demodulation for the Additive Gaussian Noise Channel", pp. 220–234.

Uddenfeldt, "The Evolution of Digital Cellular into Personal Communications", Ericsson Radio Systems AB (Sweden), pp. 201–205.

Hata et al., "Radio Link Design of Cellular Land Mobile Communication Systems", IEEE Transactions on Vehicular Technology, vol. VT–31, No. 1, Feb. 1982.

Mouly et al., The GSM Sysstem for Mobile Communications, 1992, pp. 600–611.

Schwartz et al., Communication Systems and Techniques, Inter–University Electronics Series, vol. 4, Chapter 11, "Decision–Oriented Diversity for Digital Transmission".

Gilhousen et al., "On the Capacity of a Cellular CDMA System," IEEE Transactions on Vehicular Technology, vol. 40, No. 2, May 1991.

Primary Examiner—Reinhard J. Eisenzopf
Assistant Examiner—Lee Nguyen
Attorney, Agent, or Firm—Michael A. Glenn

[57] ABSTRACT

An up-link channel assignment scheme for cellular mobile communications systems employing multibeam antennas with beam selection, in which a channel that is selected from among all variable channels in the same frequency band may be assigned to each of the antenna beams in a base station for communications. Channel selection for a base station takes place independently of that for other cells, such that the process is autonomous. Channel selection is based upon an estimate of the signal-to-interference power ration ("SIR") in which a channel having the smallest SIR estimate that is larger than or equal to a given threshold value is chosen. Alternatively, a channel having the largest SIR estimate is selected.

10 Claims, 7 Drawing Sheets

UP-LINK CHANNEL ASSIGNMENT SCHEME FOR CELLULAR MOBILE COMMUNICATIONS SYSTEMS EMPLOYING MULTI-BEAM ANTENNAS WITH BEAM SELECTION

BACKGROUND OF THE INVENTION

1. Technical Field

The invention relates to communications systems. More particularly, the invention relates to a channel assignment scheme for cellular mobile communications systems employing multi-beam antennas with beam selection.

2. Description of the Prior Art

A cellular network allows mobile communications in a specified geographic area by dividing the area into sectors, each of which is serviced by a cell site dedicated to that particular sector. Cellular systems work because a low power mobile unit is passed from cell site to cell site as the unit moves about in the service area from sector to sector. During the passing off, the mobile unit may be assigned a different communication frequency, known as a channel, corresponding to the channels allocated to the cell site in the mobile unit's current sector. In this way, the frequency spectrum within a limited service area is reused. Thus, each channel within the system may be used at a plurality of cell sites simultaneously and the system can therefore support a number of users far in excess of channels and frequency spectrum otherwise available.

There are two efficiencies that express performance of cellular communications systems: 1) power efficiency, and 2) spectrum efficiency (see, for example M. Hata, K. Kinoshita, K. Hirade, *Radio Link Design of Cellular Land Mobile Communication Systems,* IEEE Trans. VT., vol. VT-31, pp. 25–31, 1982). Power efficiency indicates how efficiently the transmitted power can be used for communications. With regard to power efficiency, a better design of the radio access scheme requires less received signal strength. Spectrum efficiency corresponds to the system user capacity for mobile communications systems that have a cellular configuration, where the same frequency spectrum is reused in geographically separated cells. A key concern with regard to spectrum efficiency in cellular mobile communications systems is resistance to co-channel interference (see, for example M. Mouly, M. B. Pautet, *The GSM System for Mobile Communications,* published by the authors: 4, rue Louise Bruneau, F-91120 Palaiseau, France, pp. 601–611, 1992).

Various schemes have been proposed for the efficient reuse and handling of channels for cellular communications systems. For example, R. Alexis, *Method and Apparatus For Selecting A Free Channel In A Mobile Radio System,* U.S. Pat. No. 4,783,780, 8 Nov. 1988 (a mobile radio system in which power levels in a signaling path are measured and compared by a mobile station with an interference threshold power level to identify duplex channels of interfering fixed stations, such that a free duplex channel is selected by the mobile station by excluding channels of interfering and engaged fixed stations); V. Graziano, *Antenna Array For A Cellular RF Communications System,* U.S. Pat. No. 4,128,740, 5 Dec. 1978 (an array of antennas for a cellular RF communications system consisting of a plurality of antenna sites at which a plurality of sectored antennas provide a plurality of communications channels, and in which channels are allocated to optimize spectrum use, while minimizing interference); and D. Reudink, Y. Yeh, *Technique For Efficient Spectrum Utilization In Mobile Radio Systems Using Space Diversity,* U.S. Pat. No. 4,355,411, 19 Oct. 1982 (a mobile radio system in which a mobile station is operated on a first communication channel when the mobile station is not experiencing interference, and in which the mobile station is switched to a different communications channel when an interference threshold level is exceeded).

The use of a combined directional multibeam antenna with beam selection is known to be effective in reducing the amount of mobile station transmitter power required to establish and maintain an acceptable communications path. A antenna beam exhibits sensitivity to signals that are received from a specific direction. In such scheme an array of beams is employed, and a beam having the largest received signal strength is selected. Hence, the use of a multibeam antenna system with beam selection improves power efficiency in a communications system.

However, with regard to co-channel interference, the beam selector may select a beam that is subject to co-channel interference if such beam produces the largest received signal strength. Such interfering selection is more likely to happen as the cell radius in a cellular communications system becomes smaller.

The problem of co-channel interference can be eliminated by decision oriented channel estimation schemes (see, for example M. Schwartz, W. R. Benett, S. Stein, *Communication Systems and Techniques,* McGraw-Hill, pp. 490–584, 1966). In such schemes, an adaptive filter based upon the least-square error criterion is used for channel estimation, where the Euclidean distance between the desired and the received signals is used as an error component. A signal having the smallest squared error is then selected from among the signals received by the multiple beams.

Another simple beam selection scheme is based upon unique word detection, where a unique word or pilot signal is embedded in a transmitted symbol stream. The receiver correlates the received signal with the unique word pattern. A signal having the largest correlation value is then selected.

It is well understood in the art that a multibeam antenna system that employs one of the various known beam selection schemes can improve the spectrum efficiency. This is because it is unlikely that the interference source is located coincidentally in the pattern of the desired beam. However, if cellular system communications frequencies are allocated to each beam in the multibeam antenna system, such that the spectrum reuse distance between each beam within the sector satisfies the system's signal-to-interference power ratio ("SIR") requirement, then such a multibeam antenna system with beam selection is equivalent to a sectored cell configuration. Accordingly, no advantageous outcome over the sectored cell would result from beam selection.

It would be advantageous to provide an improved beam selection scheme for a multibeam antenna system, such that beam selection improves power and spectrum efficiencies in a cellular communications system.

SUMMARY OF THE INVENTION

The invention provides an improved channel assignment scheme for cellular mobile communications systems, including an efficient up-link channel assignment scheme for multibeam antenna systems with beam selection. The channel assignment scheme improves the spectrum efficiency of the cellular communications system over that provided by a sectored cell configuration. In the invention, channels are not allocated to each individual beam of the multibeam antenna system. Rather, each beam can use all of the available channels in the same frequency band. The SIR is determined for each channel. The channel having the smallest SIR estimate larger than or equal to a given threshold value is selected, and that channel is assigned to each of the antenna beams in base station for communications. Alternatively, a channel having the largest SIR estimate is selected. This process takes place independently of other cells within the cellular system.

DETAILED DESCRIPTION OF THE INVENTION

The invention provides an efficient up-link channel assignment scheme for multibeam antenna systems with beam selection. The scheme described herein improves the spectrum efficiency of a cellular communications system over that of a sectored cell configuration. The scheme does not allocate frequencies individually to each beam. Rather, each beam can use all the available channels in the same frequency band. The signal-to-interference power ratio ("SIR") is estimated for each channel. The channel having the smallest SIR estimate larger than or equal to a given threshold value is selected, and assigned to each of the antenna beams in base stations for communications. This process takes place independently of other cells.

Figure 1:
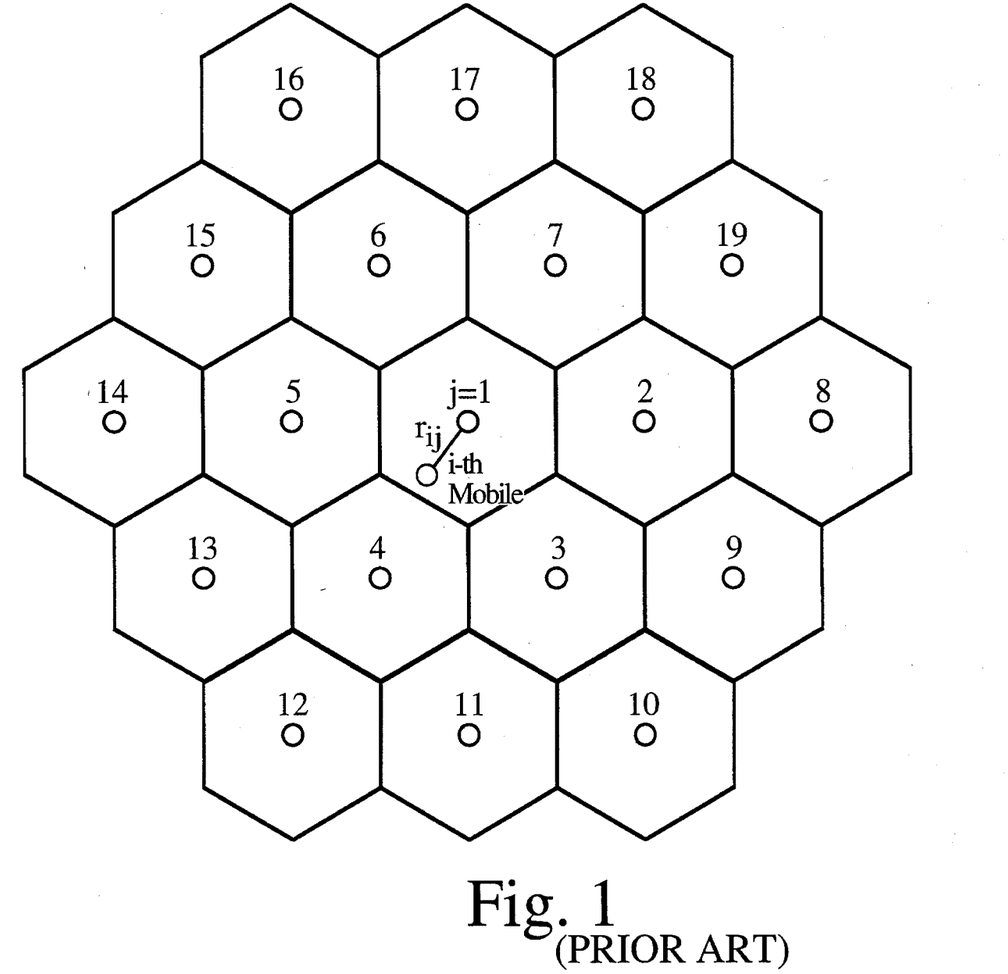
FIG. 1 is a schematic representation of an ideal hexagonal cell layout for a cellular mobile communications system.
Figure 2:
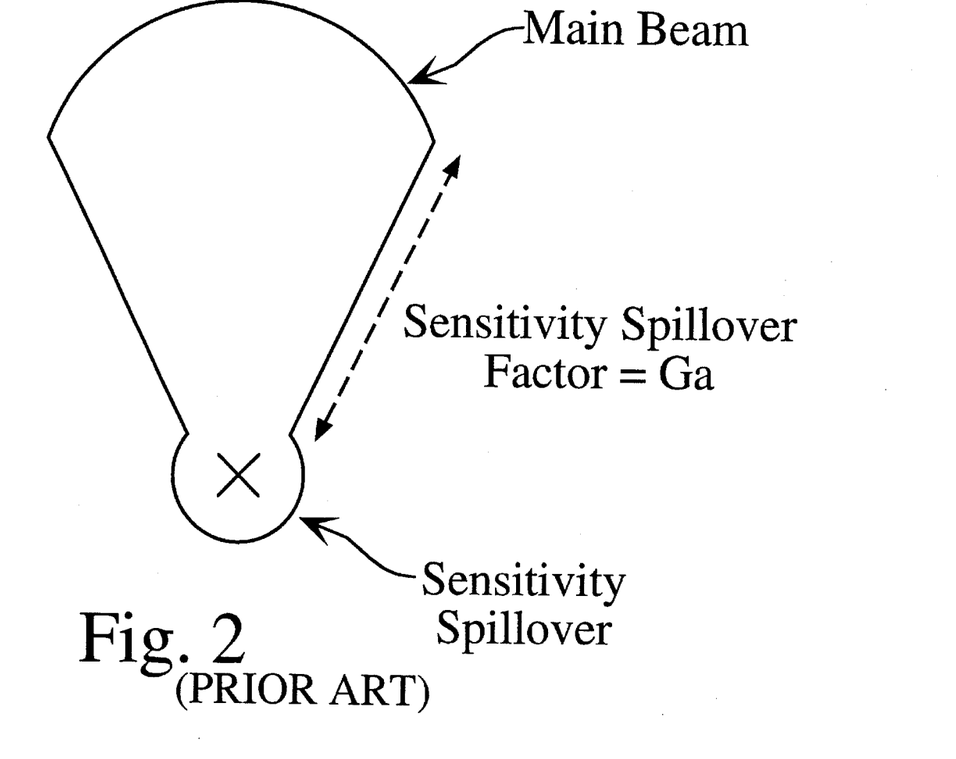
FIG. 2 is a schematic representation of an approximation of an antenna beam pattern.

FIG. 1 is a schematic representation of an ideal hexagonal cell layout for a cellular mobile communications system. The system shown in the figure consists of 19 cells, although the invention is applicable to any size system. The base station antenna in the system has B beam antennas (see FIG. 3). The beam pattern is approximated, as shown in FIG. 2. FIG. 2 also shows the sensitivity spillover factor $G_a$. For purposes of the discussion herein, the sensitivity spillover factor is identical with the sensitivity isolation factor (or the sensitivity isolation ratio). The sensitivity spillover factor is caused by side robes of the antenna pattern. It may be assumed that for computational simplicity, the antenna pattern can be approximated by that shown in the figure, which is an approximation of the worst case.

Figure 3:
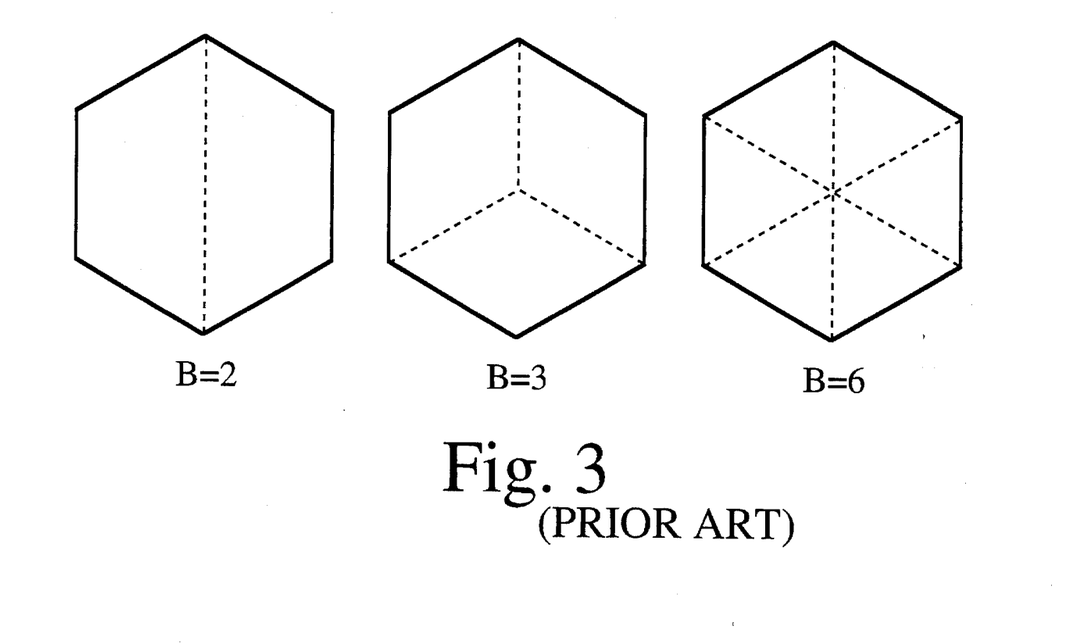
FIG. 3 is a schematic representation showing antenna beam patterns in which each base station provides a different directivity, such that all directions are covered.

FIG. 3 is a schematic representation showing antenna beam patterns for three base stations, in which each base station has a different directivity (i.e. B=2, B=3, and B=6), such that all signal directions within the base station sector are covered. Every beam has a sufficient number of receivers that are adapted receive signals of all the available channels, such that full sector coverage is provided. A beam that is oriented to cover an area in which a desired reference user is located is selected from among the B beams using a decision oriented channel estimation scheme. The Euclidean distance, i.e. the distance between the two signal points defined in the modulation format (see J. G. Proaki, *Digital Communications*, pp. 220–234, McGraw-Hill Book Company), between the desired signal point and the received signal point is measured, and then averaged over several symbols.

The Euclidean distance can be measured as follows: symbol decision on the i th received signal complex envelope $z_i$ is made by a decision circuit f(*). The Euclidean distance between the desired signal and the received signal points is then calculated as $|f(z_i)-z_i|$. The averaging process for the Euclidean distance is formulated as:

$$\text{Average Squared Euclidean Distance} = \frac{1}{N} \sum_{i=1}^{N} |f(z_i) - z_i|^2, \quad (1)$$

where N is the averaging length.

The averaged Euclidean distance is then used as a signal quality measure.

The j-th base station's (for example, refer to FIGS. 1 and 2) k-th beam receiver receives signals transmitted from the i-th mobile station with the power of:

$$P_{ijk} = r_{ij}^{-\rho} 10^{\eta/10} \text{ if the i-th mobile is in the antenna pattern; and} \quad (2)$$

$$P_{ijk} = G_a r_{ij}^{-\rho} 10^{\eta/10} \text{ if the i-th mobile is out of the antenna pattern,} \quad (3)$$

where rij is the distance between the i-th user and the j-th base stations, ρ is the distance attenuation factor, and η is a random variable corresponding to shadowing which is lognormally distributed with a mean of 0 dB, and with a standard deviation of $\sigma_s$ dB. Without loss of generality, it has been assumed for purposes of this example of the invention that the transmitter power is unity.

There are N channels in a cellular communications system. For simplicity in explanation, frequency division multiple access ("FDMA") is assumed, where different frequencies are assigned to the channels. However, as with time division multiple access ("TDMA") systems, several of the channels can use the same frequency at different time slots. It will be apparent to those skilled in the art that the invention is readily applied to TDMA systems, where the "SIR" is used as a signal-to-interference power ratio in a time slot of interest.

Each beam can use all of the available channels in the same frequency band. In this example, the i-th user communicates with the j-th base station's k-th beam. Assume that there are M users including the i-th user in the entire coverage who use the l-th channel. The received signal-to-interference power ratio, $SIR_i$, for the i-th user can then be expressed as:

$$SIR_i = \frac{P_{ijk}}{\Sigma P_{mjk}} \quad (4)$$

m∈ users in the l-th channel, m≠i.

The base station receiver also knows the $P_{ijk}$ value, for example $P_{ijk}$ can be measured by using frequencies assigned to control channels. See M. Mouly, M. B. Pautet, *The GSM System for Mobile Communications*, published by the authors, pp. 616–620, 1992). If the quality measure, as expressed by the averaged Euclidean distance, becomes worse than a threshold level, then a hand-off process is initiated. The hand-off destination channel is selected from among all the available channels in the frequency band. To determine the hand-off destination, the base station receiver measures the received composite signal power $P_L$, of the all other available channels, where:

$$P_{L=\Sigma P_{mjk}}, \quad 0 \leq L \leq N, l \neq i \quad (5)$$

m∈ users in the L-th channel.

As shown in Equations (4) and (5), the $P_{ijk}/P_L$ value can be used as an estimate of the L-th channel's SIR. An algorithm, e.g. algorithm A or B, is used to determine the hand-off destination channel, where:

Algorithm A=a channel having the smallest SIR estimate larger than or equal to the threshold value is selected; and Algorithm B=a channel having the largest SIR estimate is selected.

If there are no channels having an SIR estimate larger than the threshold value, then the i-th user keeps using the same channel. However, this user's communications quality is not necessarily worse than that guaranteed by the threshold SIR. The channel assignment process takes place in each cell simultaneously and independently of that of other cells, and therefore a better SIR may result even though the i-th user stays in the same channel.

Computer simulations were performed to evaluate the outage probability when algorithms A and B are used. The process herein is simulated as follows:

Assuming that users are uniformly distributed within an entire service area, the i-th user's location is determined as a two-dimensional uniformly distributed random variable with a range covering all areas considered. A hexagonal cell layout with three rings, as shown in FIG. 1, is considered. In the example, there are 19 cells in the entire service area (see FIG. 1). K users are first located over each of the 19 cells.

For each user location, a log-normally distributed random variable $10^{n/10}$ with a standard deviation of $\sigma_s$, which represents shadowing, is generated and multiplied by $r_{ij}^{-P}$, which represents distance attenuation. In mobile communications environments, the average signal strength received by a mobile station, of which the distance from the base station is r, can be expressed by Eq. 1 above. Furthermore, if the mobile station is out of the antenna beam pattern, the antenna sensitivity spillover factor $G_a$ is multiplied by $r_{ij}^{-P} 10^{n/10}$ to express the antenna's directivity.

This process is repeated for all the i, j, and k values, where $1 \leq i \leq K$, $1 \leq j \leq 19$, and $1 \leq k \leq B$. A beam having the largest received signal power is then selected for each user to determine the base station and antenna with which the user communicates. After this process, some cells may accommodate more than K users, and some other cells may have less than or equal to K users. Each base station selects channels randomly from among the N available channels, and assigns them to the users that are communicating with the base station. The received composite signal powers $P_L$'s, $1 \leq L \leq N$, are then calculated for all the beams associated with each base station.

For all users communicating with each base station, the received SIR's given by Eq. (3) above are calculated, and then checked to determine if the received SIR is larger than or equal to a selected threshold level. If not, hand-off is initiated, and the hand-off destination channel is given using one of the channel assignment algorithms described above. This process takes place independently of other cells, and is repeated. The number of the users having received SIR that were less than the threshold level were then summed. When the number n of such users can not be further reduced, the process is stopped. The outage probability is then given by n/(19×K).

Figure 4:
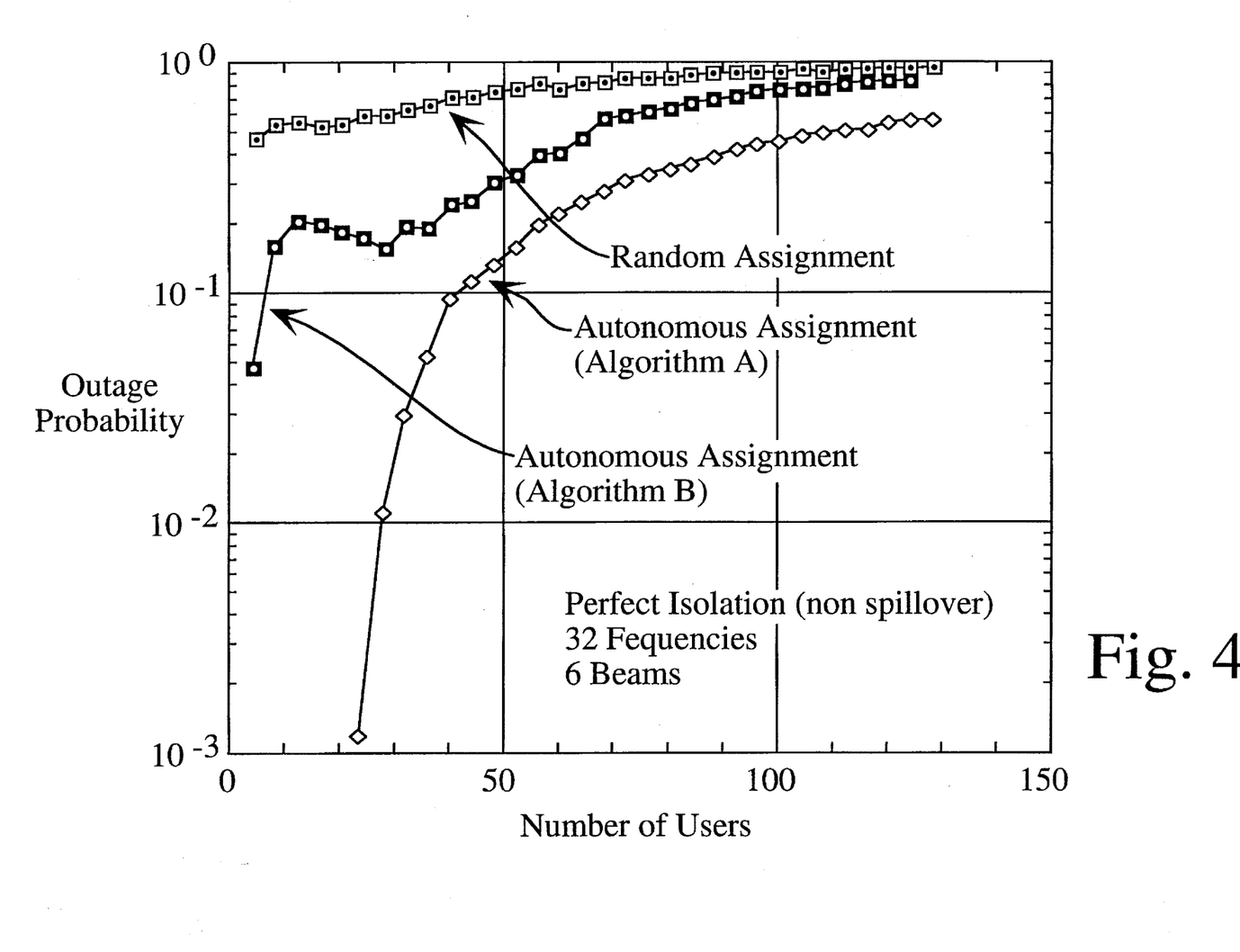
FIG. 4 is a graph plotting the outage probabilities versus the number K of per-cell users, where the number of channels N=32 and number of beams B=6, showing perfect sensitivity isolation ($G_a$=−∞dB) for random channel assignment and for autonomous channel assignment with two algorithms ("A" and "B") according to the invention.
Figure 5:
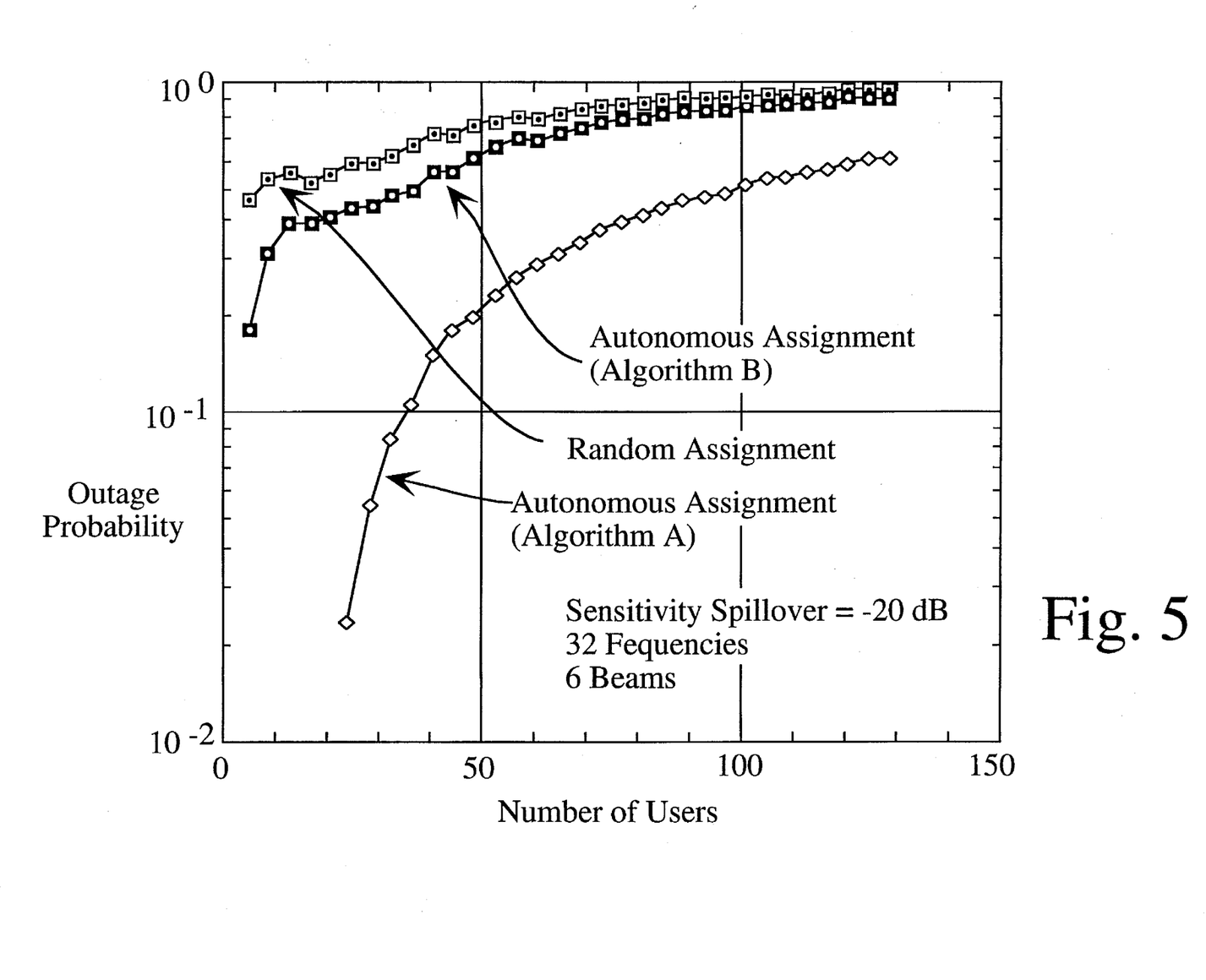
FIG. 5 is a graph plotting the outage probabilities versus the number K of per-cell users, where the number of channels N=32 and number of beams B=6, showing a sensitivity isolation ($G_a$=−20 dB) for random channel assignment and for autonomous channel assignment with two algorithms ("A" and "B") according to the invention.
Figure 6:
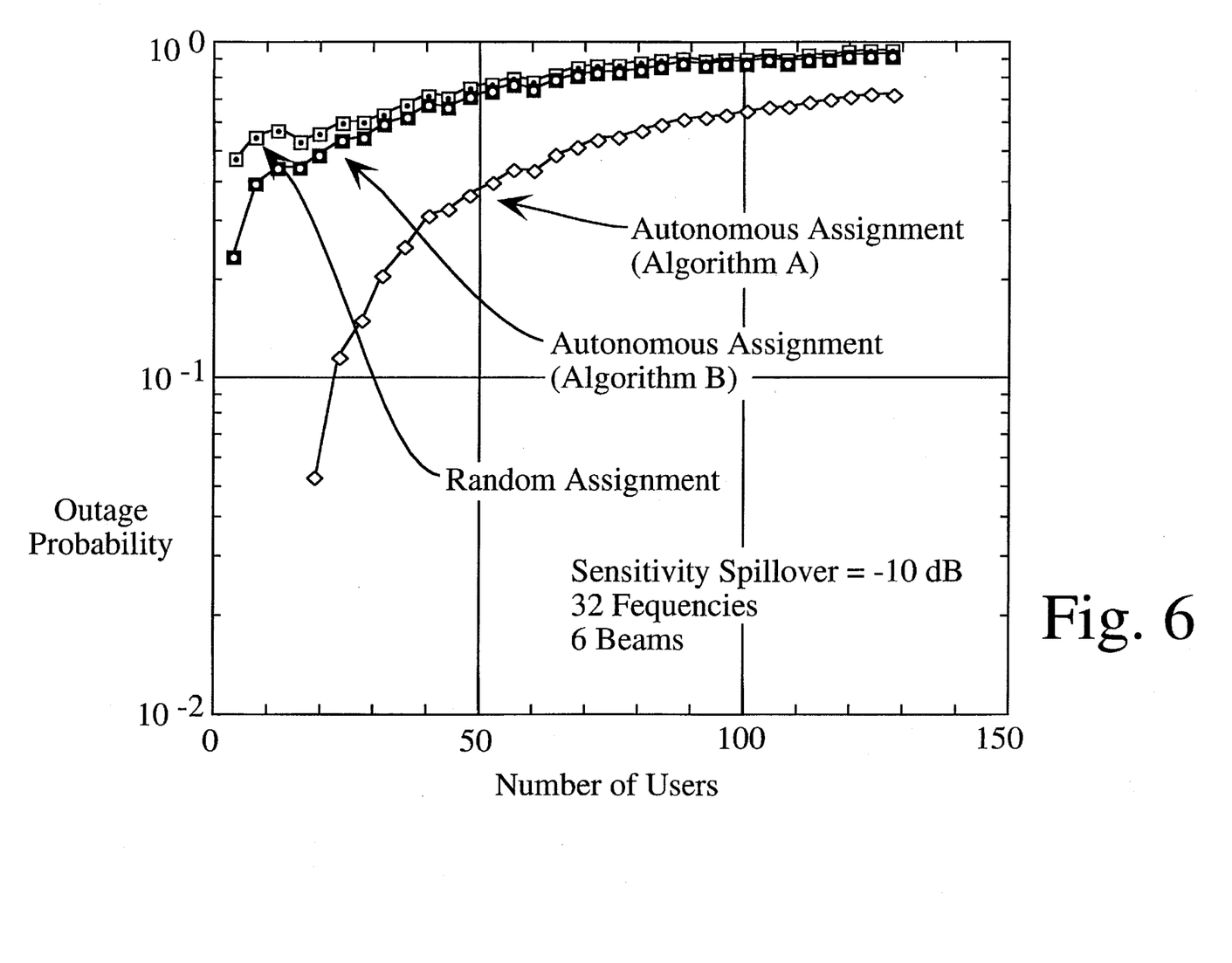
FIG. 6 is a graph plotting the outage probabilities versus the number K of per-cell users, where the number of channels N=32 and number of beams B=6, showing a sensitivity isolation ($G_a$=−10 dB) for random channel assignment and for autonomous channel assignment with two algorithms ("A" and "B") according to the invention.

FIG. 4 is a graph plotting the outage probabilities versus the number K of per-cell users, where the number of channels N=32 and number of beams B=6, showing perfect sensitivity isolation ($G_a = -\infty$ dB) for random channel assignment and for autonomous channel assignment with algorithms A and B according to the invention; FIG. 5 is a graph plotting the outage probabilities versus the number K of per-cell users, where the number of channels N=32 and number of beams B=6, showing a sensitivity isolation ($G_a = -20$ dB) for random channel assignment and for autonomous channel assignment with algorithms A and B according to the invention; and FIG. 6 is a graph plotting the outage probabilities versus the number K of per-cell users, where the number of channels N=32 and number of beams B=6, showing a sensitivity isolation ($G_a = -10$ dB) for random channel assignment and for autonomous channel assignment with algorithms A and B according to the invention. In each above figure, it is assumed that $\sigma_s = 8$ dB, $\rho = 3.5$, and the threshold SIR is 20 dB.

FIGS. 4, 5, and 6 plot the outage probabilities with algorithms A and B, together with random assignment, where there is no channel hand-off based upon SIR measurement. It can be seen that algorithm A achieves better performance than the other two schemes. Thus, with perfect sensitivity isolation, forty users can be accommodated with an outage probability of 10%. This user capacity gradually decreases as the sensitivity spillover factor increases. However, 25 users can still be accommodated even when $G_a = -10$ dB. This 78.1% (=25/32) accommodation of per-cell capacity is unexpected, and is much higher than recent results of Code Division Multiple Access ("CDMA") capacity estimation (see, for example K. S. Gilhousen, I. M. Jacobs, R. Padovani, A. J. Viterbi, L. A. Weaver, Jr., C. E. Wheatly, *On the Capacity of a Cellular CDMA System*, IEEE Trans. VT., vol. VT-40, pp. 303–312, 1991).

Outage probability with algorithm B is not as good as that with algorithm A, but it is better than that of random assignment. However, user capacity with algorithm B also decreases as the sensitivity spillover factor increase. Thus, when $G_a = -10$ dB, the algorithm B outage probability is almost identical to that of random assignment.

Table 1 below compares for 2% blocking probability the per MHz Erlang capacity, i.e. the maximum number of calls that the system can carry (see J. Uddenfeldt, *The Evolution of Digital Cellular Into Personal communications*), of a Motorola Integrated Radio System ("MIRS"), i.e. the Research & Development Center for Radio Systems ("RCRS") of Japan standard no. 32 for digital multiple channel access (digital "MCA"), system with an Advanced Mobile Phone System ("AMPS") and Qualcomm's CDMA systems, Cellular Telecommunications Industry Association ("CTIA") interim standard no. IS95, where a 1-MHz system bandwidth is assumed. It is assumed that B=6 and $G_a=-10$ dB for the proposed scheme. If the required outage probability is 10%, an MIRS system using the invention herein can achieve 2.5 times as large an Erlang capacity as hat provided by Qualcomm's CDMA system. If the required outage probability is 1%, 1.4 times the Erlang capacity gain can be achieved using the invention.

TABLE 1

Relative Spectrum Efficiencies of AMP's and Qualcomm's CDMA, Current MIRS, and MIRS's in Accordance with Algorithm "A" of the Invention

| System | AMP | MIRS (current) | Qualcomm CDMA | MIRS (Algorithm A) | MIRS (Algorithm A) |
|---|---|---|---|---|---|
| Re-use pattern | 7 | 9 | 1 (3-Sector) | 1 (10% Outage) | 1 (1% Outage) |
| Erlang Capacity Gain | 1 | 11.56 | 41.76 | 104.4 | 60.0 |

Figure 7:
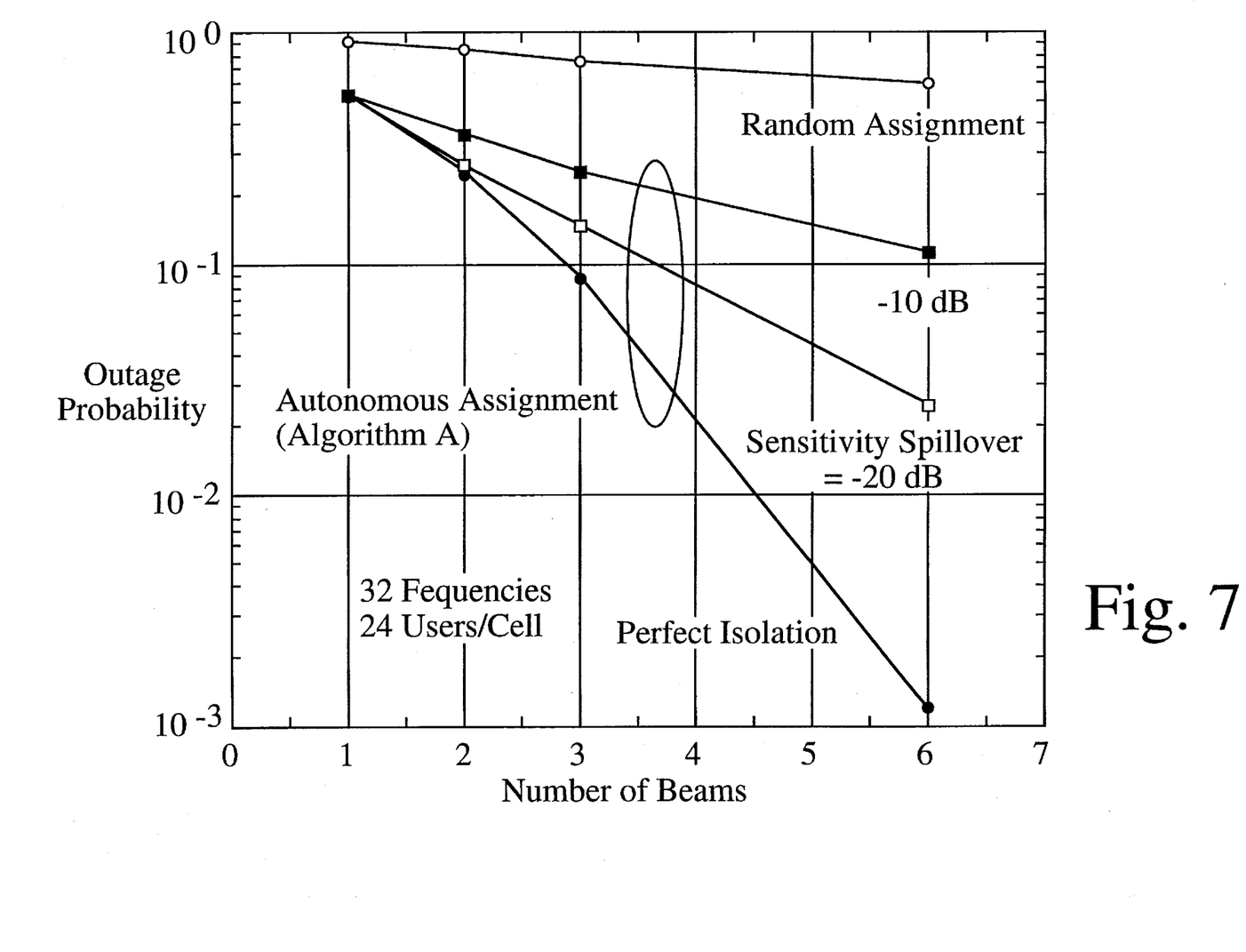
FIG. 7 is a graph plotting the outage probabilities versus the number of beams for a first autonomous channel algorithm ("A") according to the invention.

FIG. 7 is a graph plotting the outage probabilities versus the number of beams for autonomous channel algorithm A according to the invention, where N=32 and the number of per-cell users is 24, in which the sensitivity spillover factor is used as a parameter. As shown in the figure, a 10% outage probability can be achieved with a 3-beam antenna with perfect isolation, and a 15% outage probability can be achieved with $G_a=-20$ dB.

Figure 8:
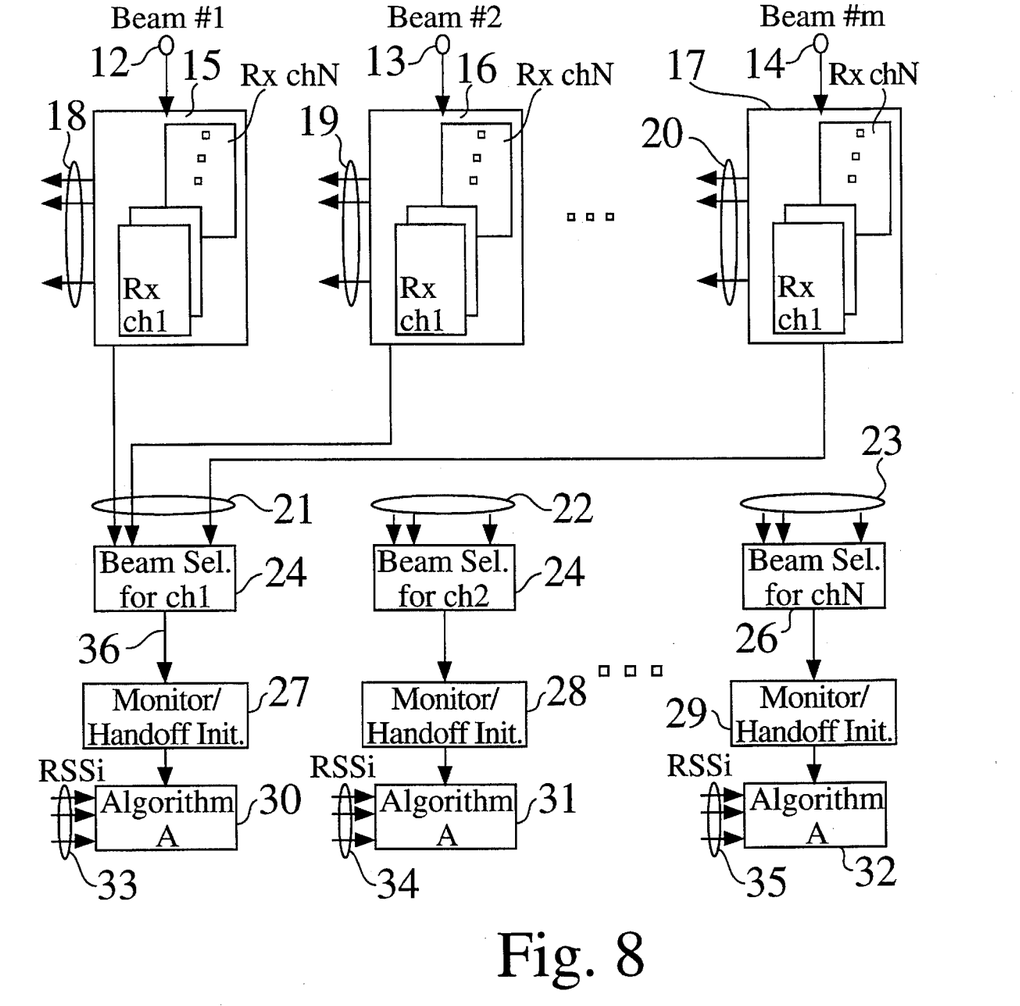
FIG. 8 is a block schematic diagram of a base station configuration according to the invention.

FIG. 8 is a block schematic diagram of a base station configuration according to the invention. In the figure, a plurality of beam antennas 12, 13, 14 are shown. Each beam antenna is coupled to a respective plurality of receivers 15, 16, 17. Each receiver produces a signal indicating received signal strength at a corresponding set of output terminals 18, 19, 20.

Each receiver operates on a particular frequency channel and provides an output signal that indicates the average Euclidean distance of the signal for the channel, as described above. This output signal is coupled via a terminal 21, 22, 23 to a beam selector 24, 25, 26 for each channel. The output of the beam selector is the averaged Euclidean distance for the selected beam and is coupled, e.g. via line 36, to a monitor/hand-off initiator 27, 28, 29. Thus, the beam selector for channel 1 (24) receives a signal indicating averaged Euclidean distance for channel 1, and so on.

The monitor/hand-off initiator is in turn coupled to an control module 30, 31, 32 that implements one of the algorithms described above, e.g. algorithm A or B, and that also has inputs 33, 34, 35 that are coupled to receive the various received signal strength signals ("RSSi") 18, 19, 20.

Although the invention is described herein with reference to the preferred embodiment, one skilled in the art will readily appreciate that other applications may be substituted for those set forth herein without departing from the spirit and scope of the present invention. For example, the two channel assignment algorithms described herein are provided for purposes of example only. It is expected that the invention will find ready application with other desired algorithms. Accordingly, the invention should only be limited by the claims included below.

We claim:

1. A channel assignment method for a cellular mobile communications system having a multibeam antenna system with beam selection, the method comprising the steps of:

estimating with said antenna a signal-to-interference power ratio ("SIR") for each channel in said cellular communications system by measuring Euclidean distance between a desired signal and a received signal and by averaging said measured distance over several samples;

using said averaged Euclidean distance as a signal quality measure; and assigning by said antenna a communications channel to each antenna beam of said multibeam system at a cell within said cellular system independently of other cells within said cellular system based upon an SIR derived value by initiating a hand-off process if said quality measure expressed by the averaged Euclidean distance becomes worse than a selected threshold level, selecting a hand-off destination channel from among all available channels in frequency band, and measuring a received composite signal power of the other channels at a base station receiver to determine said hand-off destination.

2. The method of claim 1, wherein said channel assignment step selects a channel having the smallest SIR estimate that is larger than or equal to a selected threshold value.

3. The method of claim 1, wherein said channel assignment step selects a channel having a largest SIR estimate.

4. The method of claim 1, wherein said channel assignment step keeps using the same channel if there are no channels having an SIR estimate larger than a selected threshold value.

5. The method of claim 1, wherein said channel assignment step selects any of a channel having the smallest SIR estimate that is larger than or equal to a selected threshold value, and a channel having a largest SIR estimate; and wherein said channel assignment step keeps using the same channel if there are no channels having an SIR estimate larger than said selected threshold value.

6. An up-link channel assignment apparatus for cellular mobile communications systems employing multi-beam antenna with beam selection, said apparatus comprising:

means for estimating with said antenna a signal-to-interference power ratio ("SIR") for each channel in said cellular communications system, wherein said estimating means further comprises means for measuring Euclidean distance between a desired signal and a received signal, means for averaging said measured distance over several samples, and means for using said averaged Euclidean distance as a signal quality measure; and means for assigning by said antenna a communications channel to each antenna beam of said multibeam system at a cell within said cellular system independently of other cells within said cellular system based upon an SIR derived value, wherein said assigning means further comprises means for initiating a hand-off process if said signal quality measure expressed by the averaged Euclidean distance becomes worse than a selected threshold level, means for selecting a hand-off destination channel from among all available channels in a frequency band, and means for measuring a received composite signal power of the other channels at a base station receiver to determine said hand-off destination.

7. The apparatus of claim 6, wherein said channel assignment means selects a channel having the smallest SIR estimate that is larger than or equal to a selected threshold value.

8. The apparatus of claim 6, wherein said channel assignment means selects a channel having a largest SIR estimate.

9. The apparatus of claim 6, wherein said channel assignment means keeps using the same channel if there are no channels having an SIR estimate larger than a selected threshold value.

10. The apparatus of claim 6, wherein said channel assignment means selects any of a channel having the smallest SIR estimate that is larger than or equal to a selected threshold value, and a channel having a largest SIR estimate; and wherein said channel assignment means keeps using the same channel if there are no channels having an SIR estimate larger than said selected threshold value.

* * * * *

UNITED STATES PATENT AND TRADEMARK OFFICE
CERTIFICATE OF CORRECTION

PATENT NO : 5,590,399
DATED : December 31, 1996
INVENTOR(S): Tadashi Matsumoto and Seiji Nishioka It is certified that error appears in the above-identified patent and that said Letters Patent is hereby corrected as shown below:

Cover Page [57[ Abstract, line 9, change "ration" to --ratio--.
Cover Page figure, under numeric designation "22", change numeric designation "24" to --25--.

Sheet 7 of 7 of the Figures, on Fig. 8, under numeric designation "22", change numeric designation "24" to --25--.

Column 4, line 25, change "i th" to --i-th--.
Column 4, line 48, change $\sigma_5$ to $\sigma_s$ .
Column 4, line 65, change "1-th" to --I-th--.

Column 5, lines 1 to 4, change as follows:

$$SIR_i = \frac{P_{ijk}}{\sum P_{mjk}}$$
$m \in$ users in the l-th channel, $m \neq i$.

to $$SIR_i = \frac{P_{ijk}}{\sum_{m \in \text{users in the I-th channel, } m \neq i} P_{mjk}}$$

Column 5, line 7, change ". See" to --(see--.

Column 5, lines 17-19, change as follows:

$P_L = \Sigma P_{mjk}$, $0 \leq L \leq N$, $l \neq i$
$m \in$ users in the L-th channel.

to $$P_L = \sum_{m \in \text{users in the L-th channel}} P_{mjk}, \quad 1 \leq L \leq N, L \neq I.$$

Column 5, line 51, change "P" to -- $\rho$ --.

Column 5, line 55, change "Eq. 1" to --Eq. (2)--.

Column 5, line 58, change "-P" to -- - $\rho$ --.

UNITED STATES PATENT AND TRADEMARK OFFICE
CERTIFICATE OF CORRECTION

PATENT NO : 5,590,399
DATED : December 31, 1996
INVENTOR(S): Tadashi Matsumoto and Seiji Nishioka It is certified that error appears in the above-identified patent and that said Letters Patent is hereby corrected as shown below:

Column 6, line 5, change "(3)" to --(4)--.

Column 6, line 33, change " $\sigma_s$ " to -- $\sigma_s$ --.

Column 6, line 61, change "Motorola Integrated Radio System ("MIRS")" to --digital "MCA" system--.

Column 6, line 65, change "Qualcomm's" to --IS-95--.

Column 6, line 66, delete "Cellular".

Column 6, line 67, change "CTIA" to --TIA--.

Column 6, line 67, change "IS95" to --IS-95--.

Column 7, line 3, change "an MIRS" to --a digital "MCA"--

Column 7, line 4, change "hat" to --that--.

Column 7, line 5, change "Qualcomm's" to --IS-95--.

Column 7, line 10, change "AMP's" to --AMPS--.

Column 7, line 11, change "Qualcomm's" to --IS-95--.
Column 7, line 11, change "MIRS" to --digital "MCA"--
Column 7, line 11, change "MIRS's" to --digital "MCA"'s--.

UNITED STATES PATENT AND TRADEMARK OFFICE
CERTIFICATE OF CORRECTION

PATENT NO : 5,590,399

DATED : December 31, 1996

INVENTOR(S): Tadashi Matsumoto and Seiji Nishioka

It is certified that error appears in the above-identified patent and that said Letters Patent is hereby corrected as shown below:

Column 7, line 13, change "Qualcomm" to --IS-95--.

Column 7, line 13, change "MIRS" to --digital "MCA"--.

Column 7, line 13, change "MIRS" to --digital "MCA"--.

Column 7, line 14, change "MIRS" to --digital "MCA"--.

Column 7, line 15, change "AMP" to --AMPS--.

Signed and Sealed this

Thirteenth Day of January, 1998

Attest:

BRUCE LEHMAN

Attesting Officer

Commissioner of Patents and Trademarks